(12) United States Patent
Okada et al.

(10) Patent No.: US 11,162,552 B2
(45) Date of Patent: Nov. 2, 2021

(54) FRICTION PAD ASSEMBLY FOR DISC BRAKES

(71) Applicant: AKEBONO BRAKE INDUSTRY CO., LTD., Tokyo (JP)

(72) Inventors: Yuichi Okada, Tokyo (JP); Yoshikazu Harigai, Tokyo (JP); Akihiko Yamazaki, Tokyo (JP); Takayuki Shindo, Tokyo (JP); Yoshihisa Ezawa, Tokyo (JP); Toshitaka Izumihara, Tokyo (JP); Yosuke Miyahara, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 31 days.

(21) Appl. No.: 15/759,546

(22) PCT Filed: Sep. 14, 2016

(86) PCT No.: PCT/JP2016/077084
§ 371 (c)(1),
(2) Date: Mar. 13, 2018

(87) PCT Pub. No.: WO2017/047629
PCT Pub. Date: Mar. 23, 2017

(65) Prior Publication Data
US 2019/0154093 A1    May 23, 2019

(30) Foreign Application Priority Data

Sep. 14, 2015 (JP) .............................. JP2015-181143

(51) Int. Cl.
*F16D 65/092* (2006.01)
*F16D 65/095* (2006.01)
(Continued)

(52) U.S. Cl.
CPC ............. *F16D 65/092* (2013.01); *B61H 5/00* (2013.01); *F16D 65/0006* (2013.01);
(Continued)

(58) Field of Classification Search
CPC ............. F16D 2069/0433; F16D 69/04; F16D 69/0408; F16D 65/092; F16D 65/0972; B61H 5/00
See application file for complete search history.

(56) References Cited

U.S. PATENT DOCUMENTS 2,943,713 A * 7/1960 Salak ...................... F16D 65/02
188/251 R
3,966,026 A * 6/1976 Fillderman .......... F16D 65/0006
188/73.37
(Continued)

FOREIGN PATENT DOCUMENTS

CN    A-101504045    8/2009
CN    A-102287462    12/2011
(Continued)

OTHER PUBLICATIONS

CN Office Action dated Feb. 26, 2019 in Chinese Application No. 201680053227.X (with attached English-language translation).
(Continued)

*Primary Examiner* — Robert A. Siconolfi
*Assistant Examiner* — Stephen M Bowes
(74) *Attorney, Agent, or Firm* — Faegre Drinker Biddle & Reath LLP

(57) ABSTRACT

In a friction pad assembly for a disc brake, a plurality of lining assemblies supported on a guide plate are pressed to a disc rotor. The lining assembly includes a friction material and a back plate portion. A plate fitting portion of the lining assembly is inserted and equipped to a guide hole portion, and braking torque is transmitted from the plate fitting
(Continued)

portion to the guide plate. A plurality of link plates applying pressing force from a torque receiving plate to the lining assembly are provided between the torque receiving plate and the back plate portion adhered to the guide plate. A damping layer sandwiched between inner surfaces of the torque receiving plate is provided on back surface sides of the link plates.

8 Claims, 14 Drawing Sheets

(51) Int. Cl.
  *B61H 5/00*  (2006.01)
  *F16D 65/00*  (2006.01)
  *F16D 69/04*  (2006.01)

(52) U.S. Cl.
  CPC ....... *F16D 65/095* (2013.01); *F16D 69/0408* (2013.01); *F16D 2069/0433* (2013.01); *F16D 2069/0441* (2013.01)

(56) References Cited

U.S. PATENT DOCUMENTS

| | | | | |
|---|---|---|---|---|
| 4,240,530 | A * | 12/1980 | Tillenburg | F16D 65/0006 188/250 E |
| 4,373,615 | A * | 2/1983 | Melinat | F16D 55/224 188/250 B |
| 4,535,874 | A * | 8/1985 | Pollinger | F16D 65/0006 188/217 |
| 5,099,962 | A * | 3/1992 | Furusu | F16D 65/0006 188/251 A |
| 2004/0163903 | A1 | 8/2004 | Saka | |
| 2008/0035434 | A1* | 2/2008 | Denys | F16D 65/092 188/73.37 |
| 2008/0047790 | A1 | 2/2008 | Muller et al. | |
| 2012/0298458 | A1* | 11/2012 | Hiramatsu | F16D 65/092 188/73.31 |
| 2013/0284550 | A1 | 10/2013 | Lelievre et al. | |
| 2015/0114773 | A1 | 4/2015 | Maehara | |
| 2015/0285321 | A1 | 10/2015 | Maehara et al. | |

FOREIGN PATENT DOCUMENTS

| | | | |
|---|---|---|---|
| CN | A-103328849 | 9/2013 | |
| CN | A-104271977 | 1/2015 | |
| DE | 10 2005 030619 A1 | 2/2006 | |
| EP | A1-2085637 | 8/2009 | |
| EP | A2-2088050 | 8/2009 | |
| EP | A1-2363615 | 9/2011 | |
| EP | A1-2840280 | 2/2015 | |
| JP | A-2003-227530 | 8/2003 | |
| JP | 2004-257431 A | 9/2004 | |
| JP | A-2008-133948 | 6/2008 | |
| JP | 5021468 B2 | 9/2012 | |
| JP | 2013-217407 A | 10/2013 | |
| JP | 2014-501371 A | 1/2014 | |
| JP | A-2014-095417 | 5/2014 | |
| JP | 2017223288 A * | 12/2017 | ........... F16D 65/092 |
| WO | WO-2012081641 A1 * | 6/2012 | ........... F16D 65/092 |
| WO | WO 2014-171523 A1 | 10/2014 | |

OTHER PUBLICATIONS

JP—Information offer 2015-181143 on Nov. 27, 2018 (with attached English-language translation).
Publication 2: Nichias Technical Report No. 312, 1999, vol. 2 (with attached English-language translation).
Extended European Search Report dated Mar. 28, 2019 in corresponding European patent application 16846500.3 (6 pages).
International Search Report dated Nov. 15, 2016 for PCT/JP2016/077084, including English translation.
International Search Report/Written Opinion dated Nov. 15, 2016 for PCT/JP2016/077084 [non-English language].
JP Office Action dated Aug. 13, 2019 from corresponding Japanese patent application No. 2015-181143 (with attached English-language translation).
CN Office Action dated Oct. 18, 2019 in Chinese Application No. 201680053227.X (with attached English-language translation).
Decision of Rejection dated Feb. 3, 2020 in Chinese Patent Application No. 201680053227.X (4 pages) with an English translation (4 page).

* cited by examiner

Prior Art

FRICTION PAD ASSEMBLY FOR DISC BRAKES

TECHNICAL FIELD

The present invention relates to a friction pad assembly for a disc brake.

BACKGROUND ART

A brake lining used in for example a disc brake of a vehicle, particularly a disc brake of a railroad vehicle is known (see Patent Document 1).

As shown in FIG. 14, this brake lining (a friction pad assembly for a disc brake) has a support plate 502. A plurality of friction elements 501 are fixed to the support plate 502. These friction elements 501 can be crimped on a friction surface of a brake disc (a disc rotor) during braking operation. Each friction element 501 is composed of a lining support 504 and a friction lining 503 combined to this lining support 504. A combining pin 508 is fixed to the lining support 504. The combining pin 508 penetrates the support plate 502 and is maintained by a clamp spring 507 on the backside.

The friction element 501 has a spherical section-shaped convex molding portion 510 at a side facing the support plate 502. The convex molding portion 510 is manufactured on a connecting plate 505. A cross-section contour of the connecting plate 505 is formed with a contour of the lining support 504. The convex molding portion 510 is supported in a sieve bottom spherical surface 509 of the support plate 502. Therefore, each friction element 501 can perform restricted motion (pivoting motion) and is supported on the support plate 502 tiltably.

Further, a damping layer 506 is disposed between the connecting plate 505 and the lining support 504. The damping layer 506 is sandwiched between the connecting plate 505 and the lining support 504. In the brake lining, the damping layer 506 at least sufficiently damps vibration generated during a single braking process. Therefore, a squeal noise (a noise; a sound of so-called brake) is not generated.

PRIOR ART DOCUMENT

Patent Document

Patent Document 1: Japanese Patent No. 5021468

SUMMARY OF THE INVENTION

Problems to be Solved by the Invention

In the above-described conventional brake lining, the convex molding portion 510 is formed on the friction element 501 and is supported in the sieve bottom spherical surface 509 formed on the support plate 502. Therefore, the processing cost of the convex molding portion 510 or the sieve bottom spherical surface 509 increases. In the conventional brake lining, a connecting pin 508 is fixed to the lining support 504 of the friction element 501, and this connecting pin 508 penetrates the support plate (torque receiving plate) 502 and is maintained by a clamp spring 507 on the backside. Accordingly, when fixation of the connecting pin 508 is relieved for some reason, and the connecting pin 508 or the clamp spring 507 is damaged, there is a possibility that configuration components are lost.

In general, there is a further improvement request for prevention of a special brake noise (an in-plane noise) caused by vibration in the in-plane direction of a disc rotor in a brake lining.

The present invention has been made in view of the above situation, and its object is to provide a friction pad assembly for a disc brake which can suppress the processing cost, reduce the possibility of losing configuration components, and reduce noises.

Means for Solving the Problem

The object of the present invention is achieved by the following configuration.

(1) A friction pad assembly for a disc brake, wherein a plurality of lining assemblies are supported swingably on a guide plate receiving a braking torque, and the lining assemblies are pressed against a disc rotor, wherein the lining assembly has a friction material contacting with the disc rotor at the time of braking and a back plate portion adhered to a back surface of the friction material, and includes a plate fitting portion fitting swingably into a guide hole portion provided on the guide plate at the back plate portion, the plate fitting portion is inserted and equipped to the guide hole portion from a back surface side of the guide plate, a braking torque acting upon contact between the disc rotor and the friction material is transmitted from the plate fitting portion to the guide plate, and an damping layer is provided between the torque receiving plate and the back plate portion adhered to the guide plate.

According to the friction pad assembly for a disc brake having the configuration of (1) above, pressing force from the torque receiving plate is transmitted to the lining assembly via the damping layer. Therefore, it is unnecessary for the torque receiving plate to process like a sieve bottom spherical surface 509 in a conventional brake lining.

In the friction pad assembly for a disc brake having the configuration of (1) above, the guide plate and the torque receiving plate are formed into an integrated housing structure via fastening by fastening members such as rivets.

Furthermore, the damping layer provided between the torque receiving plate and the back plate portion contribute to reduction of noises due to contact between the torque receiving plate and the back plate portion. That is, since the damping layer blocks or reduces vibration spreading between the lining assembly and the torque receiving plate, it is possible to reduce noises.

(2) The friction pad assembly for a disc brake described in (1) above, wherein a plurality of link plates are provided which are deployed across a plurality of the lining assemblies between the torque receiving plate and the back plate portion and allow pressing force from the torque receiving plate to act on the lining assemblies, and the damping layer is provided on at least one side of the front surface side and the back surface side of the link plate.

According to the friction pad assembly for a disc brake having the configuration of (1) above, pressing force from the torque receiving plate is transmitted to the lining assembly via a link plate.

Therefore, it is not necessary for the torque receiving plate to process like a sieve bottom spherical surface 509 in a conventional brake lining.

The damping layer provided on at least one side of the front surface side and the back surface side of the link plate contributes to reduction of noises due to contact between the link plate and the torque receiving plate or the back plate portion. That is, since the damping layer blocks or reduces vibration spreading between the lining assembly and the torque receiving plate, it is possible to reduce noises.

(3) The friction pad assembly for a disc brake described in (2) above, wherein the damping layer is sandwiched between the inner surface of the torque receiving plate and the back surface of the link plate.

The friction pad assembly for a disc brake having the configuration of (3) above contributes to noise reduction due to contact between the torque receiving plate and the link plate sandwiched between the inner surface of the torque receiving plate and the back surface of the link plate. That is, since the damping layer blocks or reduces vibration spreading between the lining assembly and the torque receiving plate, it is possible to reduce noises.

(4) The friction pad assembly for a disc brake described in any one of (1) to (3) above, wherein the damping layer is a laminated shim where a metal support plate and an elastic material are stuck together and laminated.

According to the friction pad assembly for a disc brake having the configuration of (4) above, the damping layer is a laminated structure having appropriate modulus of elasticity in the in-plane and perpendicular directions. The laminated structure can control the modulus of elasticity in the in-plane and perpendicular directions. The damping layer composed of the laminated shim can appropriately control displacement (spring constant) in the in-plane and perpendicular directions, and it is possible to exert large effects on the in-plane noise.

(5) The friction pad assembly for a disc brake described in (3) above, wherein an embedment hole, into which a protrusion protruding from the link plate toward the inner surface of the torque receiving plate is embedded, is formed in the damping layer sandwiched between the inner surface of the torque receiving plate and the back surface of the link plate.

According to the friction pad assembly for a disc brake having the configuration of (5) above, even in a case where a conventional link plate where the protrusion is protruded toward the inner surface of the torque receiving plate is used, the contact between the protrusion and the torque receiving plate is evaded, and the damping layer can be sandwiched between the inner surface of the torque receiving plate and the back surface of the link plate. Therefore, since the damping layer blocks or reduces vibration spreading between the lining assembly and the torque receiving plate, it is possible to reduce noises.

(6) The friction pad assembly for a disc brake described in any one of (1) to (5) above, wherein the damping layer has an adhesive layer adhered to the inner surface of the torque receiving plate or the back plate portion.

According to the friction pad assembly for a disc brake having the configuration of (6) above, the damping layer is adhered to the inner surface of the torque receiving plate, or the back plate portion by the adhesive layer. Therefore, the guide plate, the lining assembly, the damping layer, the link plate, the torque receiving plate and the damping layer are in a sequentially laminated and assembled procedure, and since the damping layer is temporarily maintained in the back plate portion or the torque receiving plate in a positioned state, the assembling property is improved.

Effect of the Invention

According to the friction pad assembly for a disc brake according to the present invention, the processing cost is suppressed, the possibility of losing configuration components can be reduced, and noises can be reduced.

The present invention is described briefly above. Furthermore, details of the present invention will be clarified by reading forms (referred to as "embodiment" below) for conducting the invention described below with reference to attached drawings.

DESCRIPTION OF EMBODIMENTS

Hereinafter, an embodiment according to the present invention will be described with reference to the drawings.

Figure 1:
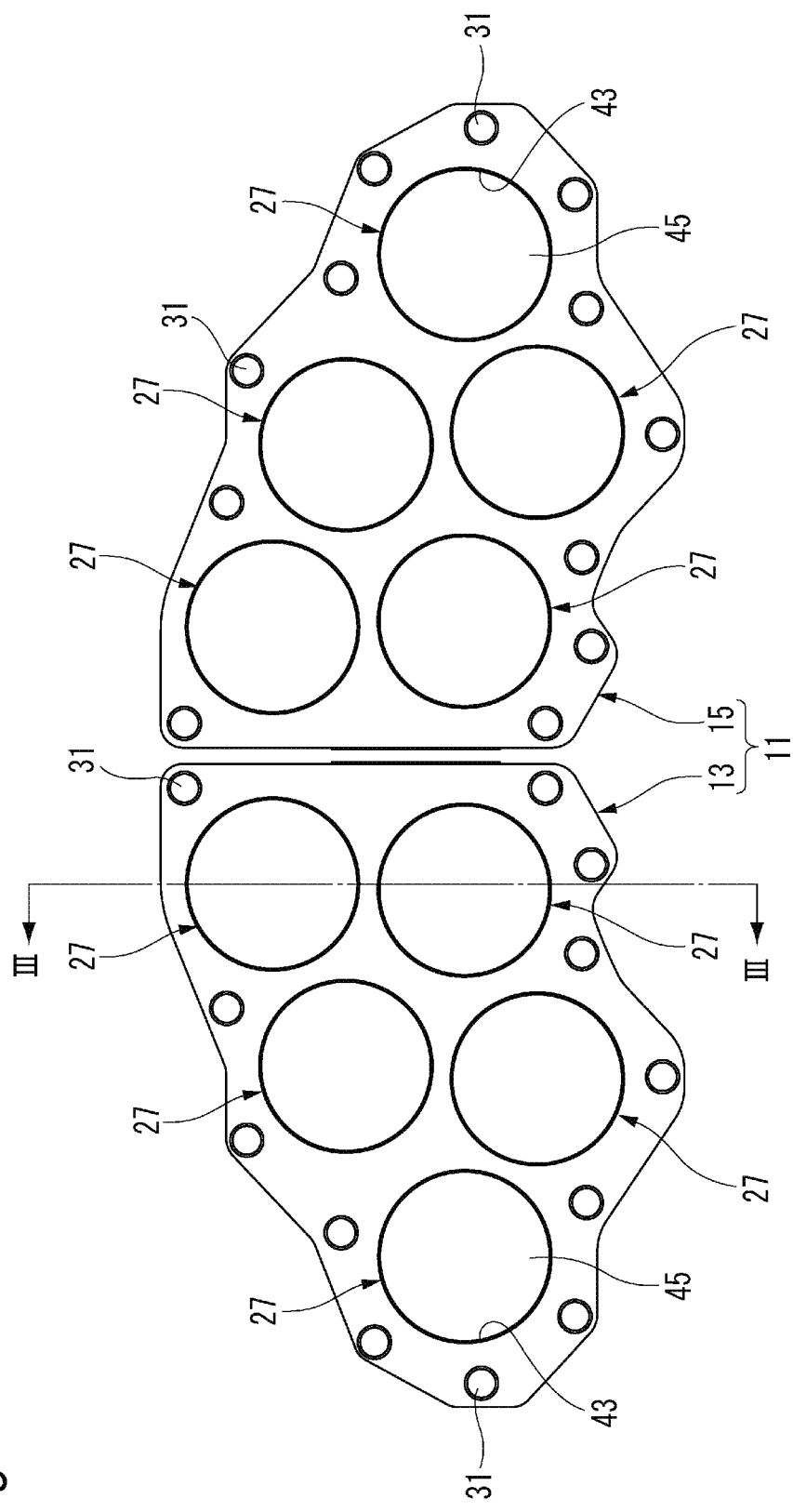
FIG. 1 is a front view of a friction pad assembly for a disc brake according to a first embodiment of the present invention.
Figure 2:
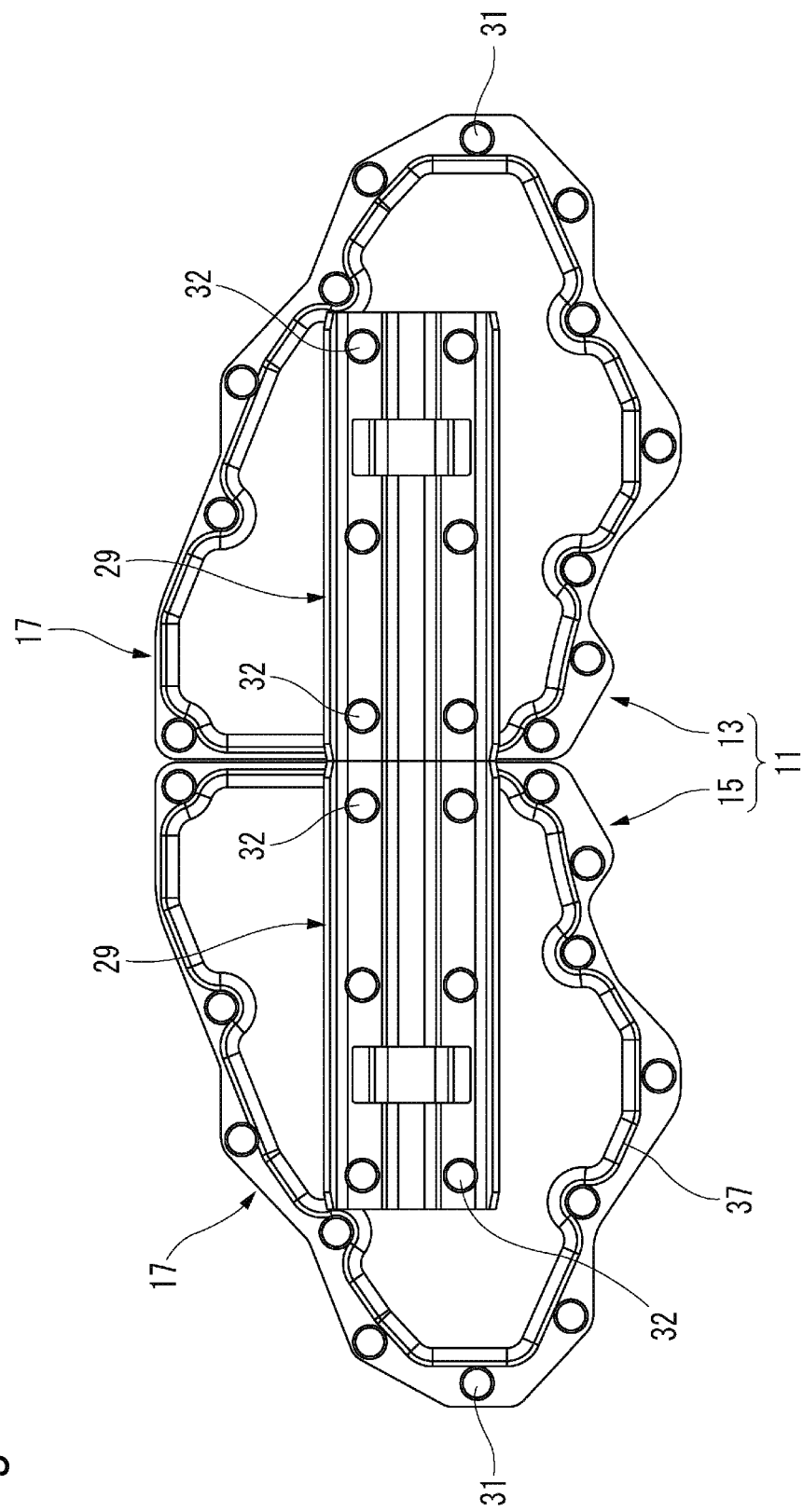
FIG. 2 is a back view of the friction pad assembly for a disc brake shown in FIG. 1.

As shown in FIGS. 1 and 2, since a friction pad assembly 11 for a disc brake according to a first embodiment of the present invention is used in a disc brake device for a railroad vehicle, the friction pad assembly is composed of a first friction pad assembly 13 and a second friction pad assembly 15 adjacently disposed in a circumferential direction of a disc rotor not shown on an axle.

The first friction pad assembly 13 and the second friction pad assembly 15 have the same configuration, and are driven forward and backward to a surface of the disc rotor by an actuator involved in a brake caliper which is disposed to be opposed to the disc rotor on the axle and fixed to a vehicle body frame.

As shown in FIGS. 2 to 5, the first friction pad assembly 13 and the second friction pad assembly 15 are composed of a torque receiving plate 17 driven forward and backward to the disc rotor by the actuator involved in the brake caliper (not shown), a first link plate 21 and a second link plate 23 which are two types of link plates laid on a substantially flat surface on the inner surface of the disc rotor side of this torque receiving plate 17, a guide plate 25 connected and fixed to the torque receiving plate 17 on the disc rotor side of the torque receiving plate 17, and five lining assemblies 27 swingably fitted and supported by the guide plate 25.

As shown in FIG. 2, an anchor plate 29 is fixedly equipped by rivets 32 on the back surface of the torque receiving plate 17. This anchor plate 29 is connected to an actuator involved in the brake caliper, and it is possible to drive the first friction pad assembly 13 and the second friction pad assembly 15 forward and backward to the disc rotor.

Figure 3:
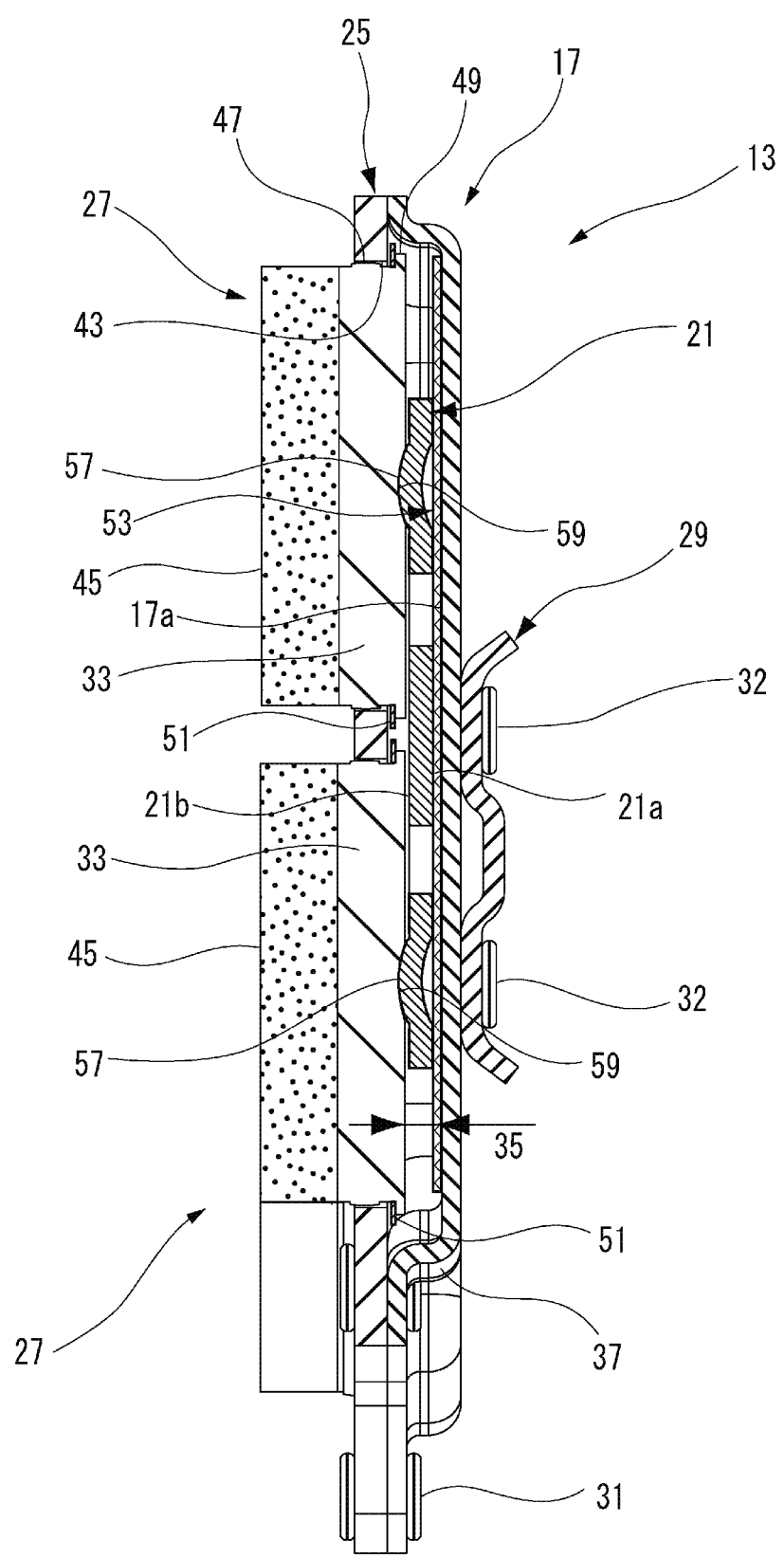
FIG. 3 is a sectional view along a line III-III of FIG. 1.

Since the torque receiving plate 17 opens a gap 35 between back plate portions 33 of the lining assembly 27 shown in FIG. 3, it is molded in a thin dish shape which protrudes to the peripheral portion of flat plate materials and forms a peripheral wall 37 to seal the back surface side of the back plate portion 33. Also, the torque receiving plate 17 opens the gap 35 between the back plate portions 33 of the lining assembly 27, and is fastened to the peripheral portion of the guide plate 25 by rivets 31 which is a fastening member.

Figure 5:
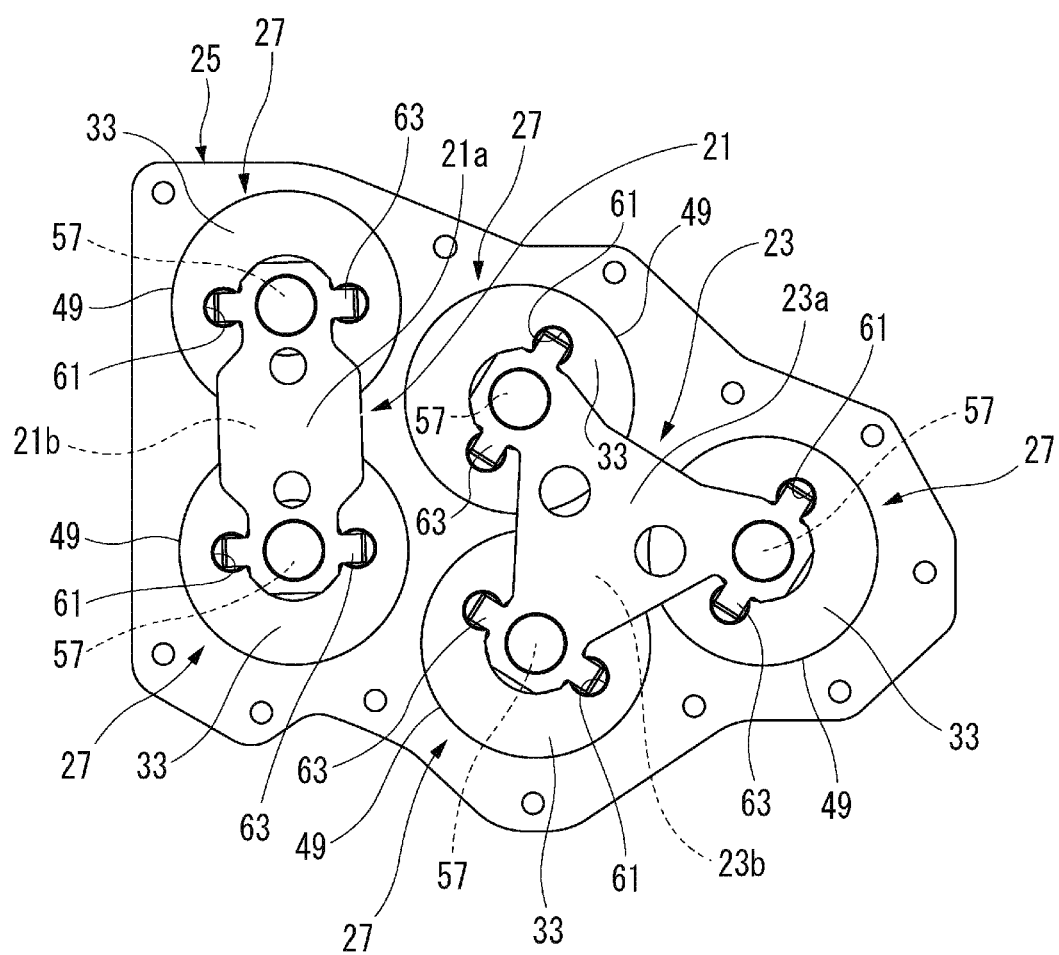
FIG. 5 is a back view of a state where the torque receiving plate and the damping layer are removed from a first friction pad assembly shown in FIG. 2.

As shown in FIG. 5, the first link plate 21 and the second link plate 23 are deployed across the plurality of lining assemblies 27 and apply pressing force from the torque receiving plate 17 to these lining assemblies 27.

Each of the surfaces of the torque receiving plate 17 on sides of the first link plate 21 and the second link plate 23 is formed of a smooth surface.

In the guide plate 25, five guide hole portions 43 are formed at predetermined separated intervals, and the lining assembly 27 is equipped on each of the guide hole portions 43.

The lining assembly 27 is composed of a friction material 45 molded in a substantially disc shape and a back plate portion 33 adhered to the back surface of the friction material 45. As shown in FIG. 3, the back plate portion 33 is provided with a plate fitting portion 47 whose outer peripheral surface is swingably fitted into a circular guide hole portion 43 penetratingly formed in the guide plate 25, and a retaining flange portion 49 whose outer diameter is larger than that of the guide hole portion 43. The lining assembly 27 transmits a braking torque acting when the disc rotor is brought into contact with the friction material 45 from the plate fitting portion 47 to the guide plate 25.

An annular plate spring 51 is fitted to the plate fitting portion 47. The outer diameter of the plate spring 51 is set larger than the guide hole portion 43. The plate spring 51 fitted to the plate fitting portion 47 is interposed between the guide plate 25 and the retaining flange portion 49, and each lining assembly 27 is inserted and equipped from the back surface of the guide plate 25 to the guide hole portion 43 to transmit the braking torque acting when the disc rotor is brought into contact with the friction material 45 from the plate fitting portion 47 to the guide plate 25.

In the friction pad assembly 11 for a disc brake, although a plurality (ten in the present embodiment) of the lining assemblies 27 are laid in a plane shape, since the plate spring 51 disposed so as to be interposed between the retaining flange portion 49 of the lining assembly 27 and the guide plate 25 absorbs dimensional tolerance in the thickness direction of the lining assembly 27, dispersion can be prevented from occurring in the contact property of each of the lining assemblies 27 with the disc rotor.

Therefore, stabilized braking characteristics can be maintained without being influenced by the dimensional tolerance in the thickness direction of the lining assembly 27.

In the back plate portion 33 of each of the lining assemblies 27, a link abutting portion 59 having a concave curved shape at the center is formed, and an engagement hole 61 for baffling shown in FIG. 5 is formed at a position away from the center.

Correspondingly, on the first link plate 21 and the second link plate 23, a rotation regulating portion 63 which is loosely fitted into the engagement hole 61 and regulates the rotational behavior of the lining assembly 27 is provided. The rotation regulating portion 63 is formed by bending protruding pieces extending to the end portions of the first link plate 21 and the second link plate 23 to the engaging hole side.

Further, on the first link plate 21 and the second link plate 23, a back plate abutting curved surface portion 57 is formed corresponding to the link abutting portion 59 of the back plate portion 33. The back plate abutting curved surface portion 57 is formed as a convex curved surface on which the link abutting portion 59 abuts swingably.

Figure 4A:
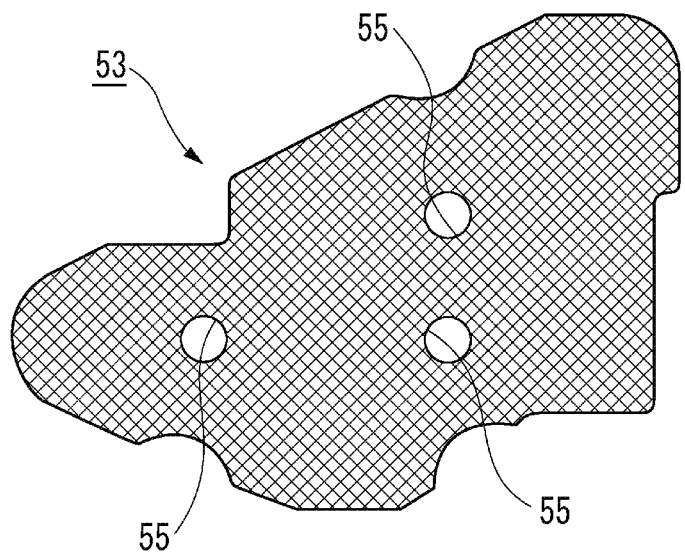
FIG. 4A is a front view of a damping layer shown in FIG. 3.
Figure 4B:
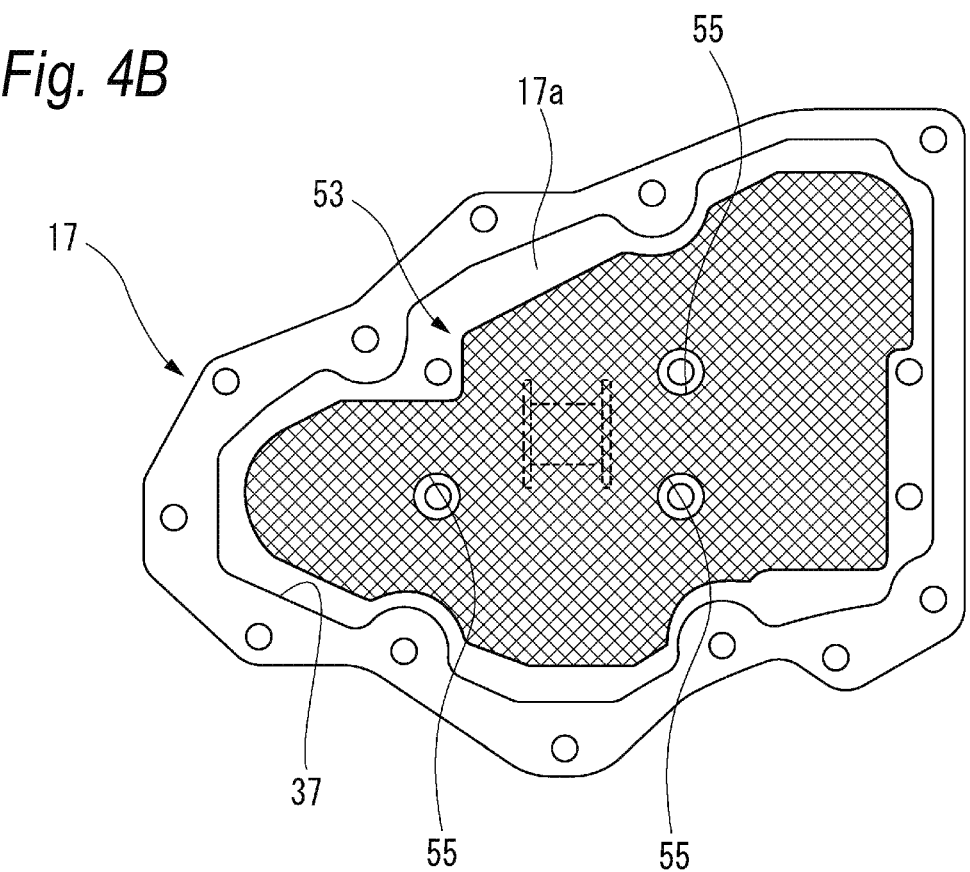
FIG. 4B is a front view of a torque receiving plate where the damping layer is attached.

As shown in FIG. 3, at sides of the back surface 21a, 23a of the first link plate 21 and the second link plate 23, the damping layer 53 sandwiched between the inner surfaces 17a of the torque receiving plate 17 is provided. The damping layer 53 is formed in a uniform thickness. As shown in FIGS. 4a and 4b, the damping layer 53 is formed in a shape slightly similar to the torque receiving plate 17 along a peripheral wall 37 in the inner surface 17a of the torque receiving plate 17. Evasion holes 55 are bored on the damping layer 53 for avoiding interference with the rivets 32 for fixing the anchor plate 29. Therefore, the surface of the damping layer 53 is a flat surface the same as the inner surface 17a of the torque receiving plate 17. The damping layer 53 is adhered to the inner surface 17a of the torque receiving plate 17 by for example, an adhesive layer (not shown).

Figure 6:
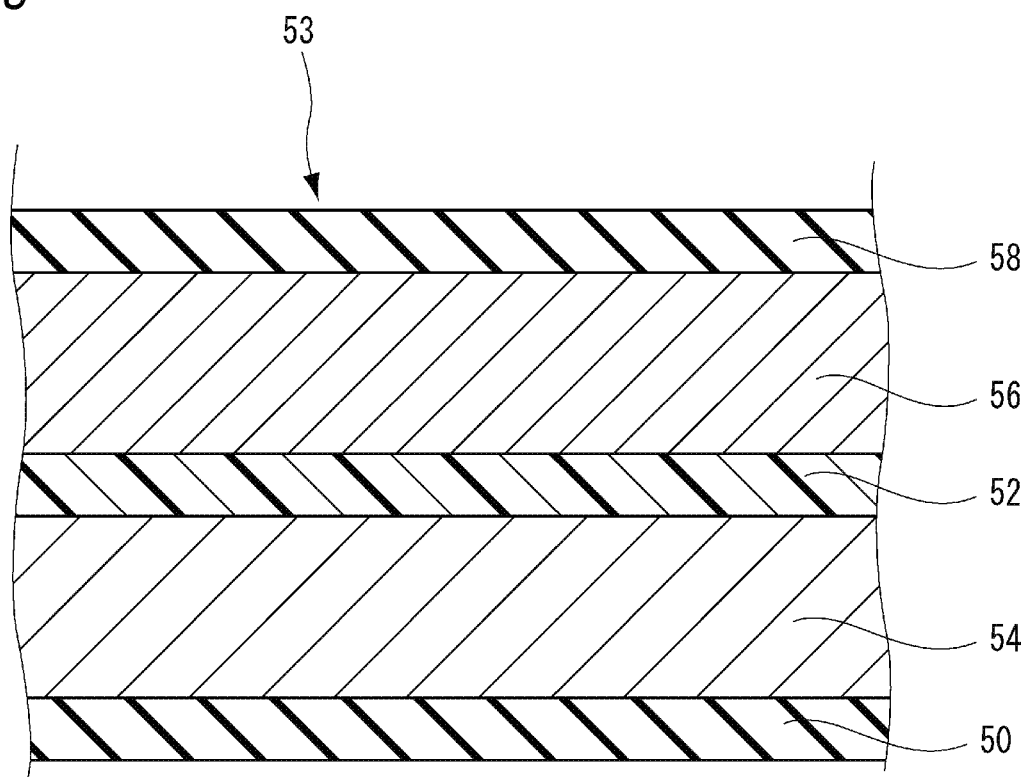
FIG. 6 is a sectional view in the perpendicular direction of a laminated shim used in the damping layer.

In the first embodiment, the damping layer 53 is a laminated shim in a state where a metal support plate and an elastic material are stuck together and laminated. The damping layer 53 is a laminated structure having an appropriate modulus of elasticity in the in-plane and perpendicular directions. As shown in FIG. 6, the laminated structure has a structure where, for example, from the link plate side, rubber 50 which is an elastic material, a stainless steel plate 54 which is a metal support plate, an adhesive material 52 which is an elastic material, a cold rolled steel plate 56 which is a metal support plate, and a rubber 58 which is an elastic material are stuck together and laminated in order. Certainly, the damping layer of the present invention is not limited to the laminated structure of the present embodiment, and various laminated structures or single-layer structures can be adopted as long as brake noises can be prevented.

Next, an assembling procedure of the first friction pad assembly 13 and the second friction pad assembly 15 will be explained by taking the first friction pad assembly 13 as an example.

To assemble the first friction pad assembly 13, the lining assembly 27 is inserted and equipped to the guide hole 43 of the guide plate 25 set with the back surface facing upward, so that the friction material 45 protrudes to the front side (the left side in FIG. 3) of the guide plate 25. At this time, the plate spring 51 is fitted to the plate fitting portion 47 of each lining assembly 27. By inserting the lining assembly 27 into the guide hole portion 43, the plate spring 51 is sandwiched between the guide plate 25 and the retaining flange portion 49. In the lining assembly 27 inserted and equipped to the guide hole portion 43, the retaining flange portion 49 is brought into abutment on the peripheral portion of the guide hole portion 43 via the plate spring 51.

Then, the first link plate 21 and the second link plate 23 are placed on the lining assembly 27 so that the back plate abutting curved surface portion 57 is facing the link abutting portion 59 at the center of the back surface of the back plate portion 33. At the same time, rotation regulating portions 63 of the first link plate 21 and the second link plate 23 are engaged to the engagement holes 61 for baffling.

In a state where the first link plate 21 and the second link plate 23 are equipped to the back side of the lining assembly 27, the torque receiving plate 17 is adhered to the outer peripheral portion of the guide plate 25 by the rivets 31. At this time, the anchor plate 29 is fixed to the torque receiving plate 17 by the rivets 32. The damping layer 53 is attached to the inner surface 17a of the torque receiving plate 17 in advance. Finally, the outer peripheral portions of the guide plate 25 and the torque receiving plate 17 are clamped and fixed by the rivets 31 penetrating each other, and the assembling of the friction pad assembly 11 for a disc brake is complete.

Next, the function of the above configuration will be described.

In the friction pad assembly 11 for a disc brake according to the present embodiment, the first link plate 21 and the second link plate 23 apply pressing force from the torque receiving plate 17 to the lining assembly 27. The damping layer 53 is provided between the first link plate 21 and the torque receiving plate 17, and between the second link plate 23 and the torque receiving plate 17. That is, the pressing force from the torque receiving plate 17 is transmitted to the first link plate 21 and the second link plate 23 via the damping layer 53.

Figure 14:
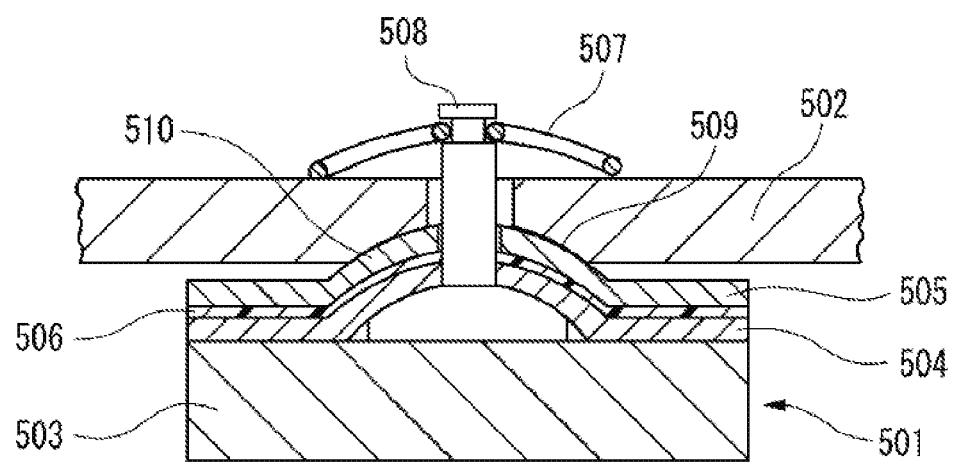
FIG. 14 is a sectional side view of a portion of a conventional brake lining.

Therefore, it is unnecessary for the torque receiving plate 17 to be processed like a sieve bottom spherical surface 509 (refer to FIG. 14) in a conventional brake lining. In the first link plate 21 and the second link plate 23, a slight swing is allowed by the displacement in the thickness direction of the damping layer 53. In the friction pad assembly 11 for a disc brake, each lining assembly 27 divided small is swingably supported by the first link plate 21 and the second link plate 23. Accordingly, the lining assembly 27 follows undulation of a surface of the disc rotor by individual swinging, and contacts the surface of the disc rotor. Therefore, the friction pad assembly 11 for a disc brake maintains a stable friction area and can maintain stable braking characteristics.

In the friction pad assembly 11 for a disc brake, the guide plate 25 and the torque receiving plate 17 are formed into an integrated housing structure via fastening by the rivets 31. The outer diameter of the retaining flange portion 49 formed on the back plate portion 33 of the lining assembly 27 is set to be larger than the guide hole portion 43 of the guide plate 25, and the lining assembly 27 does not fall off from the guide plate 25 due to the catch of the retaining flange portion 49. Therefore, while a firm housing structure without looseness due to vibration or the like is obtained, a structure with high safety and low price where the lining assembly 27 does not fall off the guide plate 25 can be obtained.

Further, the damping layer 53 provided between the inner surfaces 17a of the torque receiving plate 17 and the back surfaces 21a, 23a of the first link plate 21 and the second link plate 23 contribute to reduction of noises due to contact of the first link plate 21 and the second link plate 23 with the torque receiving plate 17. That is, since the damping layer 53 blocks or reduces vibrations spreading between the lining assembly 27 and the torque receiving plate 17, it is possible to reduce noises.

In addition, in the friction pad assembly 11 for a disc brake of the first embodiment, the damping layer 53 is a laminated structure having an appropriate modulus of elasticity in the in-plane and perpendicular directions. Accordingly, the damping layer 53 can control the modulus of elasticity in the in-plane and orthogonal directions. It is possible to control the modulus of elasticity and the displacement amount in a material vertical direction (a direction perpendicular to the rotor) depending on the material (the rubber 50, 58, the adhesive material 52) of a viscoelastic body to be laminated and the number of layers. Further, by applying minute unevenness (dimples) to the rubber surface, it is also possible to increase the displacement amount in a direction parallel to the material surface (the in-plane direction of the rotor). In this way, the damping layer 53 composed of the laminated shim can appropriately control displacement (spring constant) in the in-plane and perpendicular directions, and it is possible to exert large effects on the in-plane noise.

Therefore, according to the friction pad assembly 11 for a disc brake according to the first embodiment, the possibility of losing configuration components can be reduced while the processing cost is suppressed, and the noises caused by the contact between the first link plate 21 and the second link plate 23 with the torque receiving plate 17 can be reduced.

Next, a second embodiment of the friction pad assembly for a disc brake according to the present invention will be described.

Figure 7:
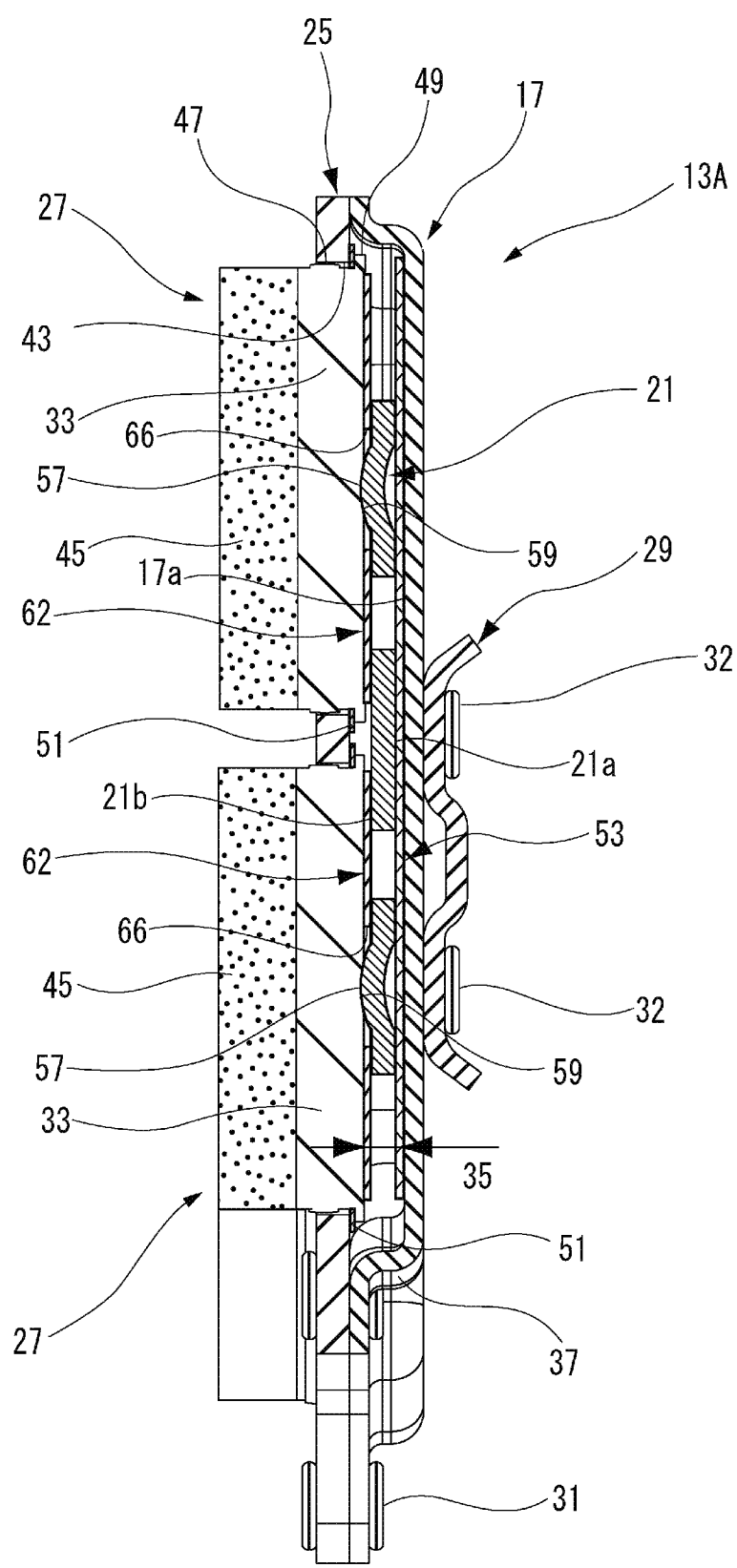
FIG. 7 is a sectional view of a friction pad assembly for a disc brake according to a second embodiment of the present invention.
Figure 8A:
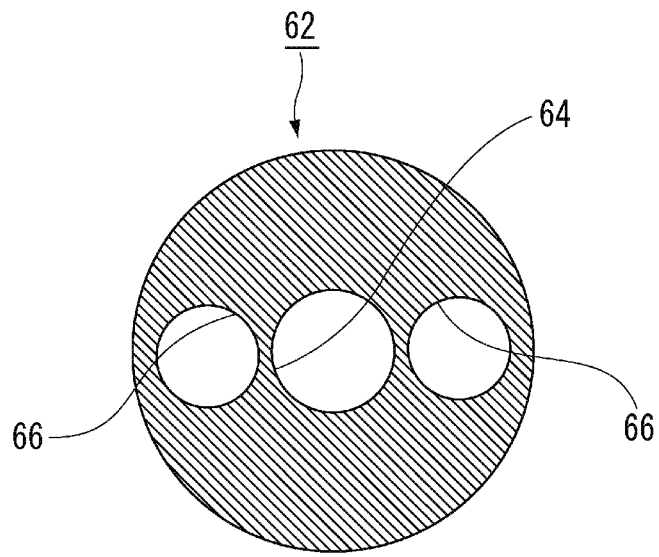
FIG. 8A is a front view of the damping layer shown in FIG. 6.
Figure 8B:
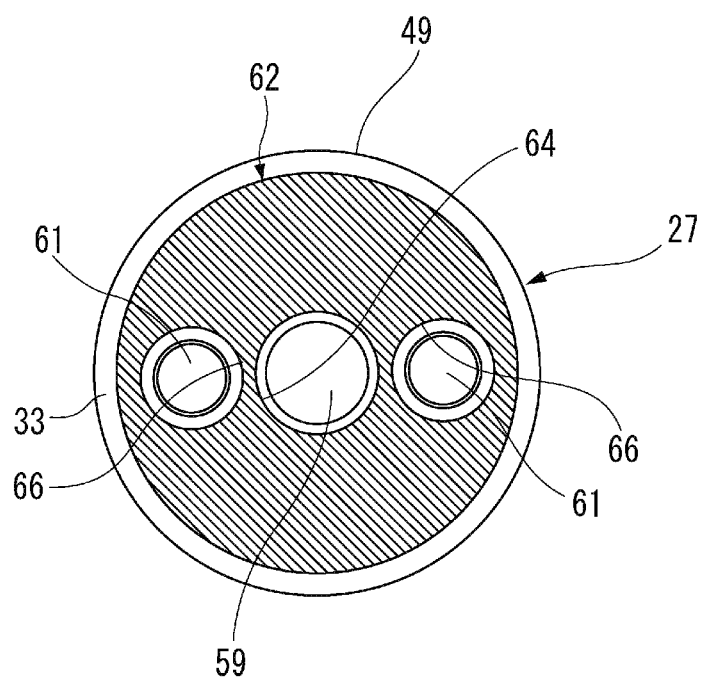
FIG. 8B is a back view of a back plate portion where the damping layer is attached.

FIG. 7 is a sectional view of a friction pad assembly for a disc brake according to the second embodiment of the present invention, FIG. 8A is a front view of the damping layer shown in FIG. 6, and FIG. 8B is a back view of a back plate portion where the damping layer is attached. In the following embodiments and modifications, the same reference numerals are given to the same members/parts as members/parts of the friction pad assembly 11 for a disc brake shown in FIGS. 1 to 6, and repeated description is omitted.

As shown in FIG. 7, in the first friction pad assembly 13A of the friction pad assembly for a disc brake according to the second embodiment, a back plate portion 33, an additional damping layer 62 serving as a damping layer interposed between the back plate portion 33 and the surfaces 21b, 23b of the first link plate 21 and the second link plate 23 are provided. As shown in FIGS. 8a and 8b, an abutting portion presenting hole 64 for presenting the link abutting portion 59 of the back plate portion 33, an engagement hole presenting hole 66 for presenting the engagement hole 61 are bored on the additional damping layer 62. In the second embodiment, the same damping layer 53 as that in the first embodiment is also provided. That is, the damping layer 53 and the additional damping layer 62 interposing the first link plate 21 and the second link plate 23 are provided in two layers between the lining assembly 27 at sides of surfaces 21b, 23b and sides of the back surfaces 21a, 23a of the first link plate 21 and the second link plate 23 and the torque receiving plate 17.

According to this friction pad assembly for a disc brake, the additional damping layer 62 provided between the back plate portion 33 and the surfaces 21b, 23b of the first link plate 21 and the second link plate 23 contributes to reduction of noises between the back plate portion 33 and the first link plate 21 as well as the second link plate 23. That is, since the additional damping layer 62 blocks or reduces vibrations spreading between the lining assembly 27 and the first link plate 21 as well as the second link plate 23, it is possible to reduce even more noises.

According to the friction pad assembly for a disc brake according to the second embodiment, a noise reducing effect can be further improved compared with the configuration of the first embodiment with only the damping layer 53.

In a case where the damping layer 53 is not provided between the back surfaces 21a, 23a of the first link plate 21 and the second link plate 23 and the inner surface 17a of the torque receiving plate 17 but only the additional damping layer 62 is provided, it can also be said that it is possible to reduce noises compared with the conventional brake lining.

Next, a third embodiment of the friction pad assembly for a disc brake according to the present invention will be described.

Figure 9:
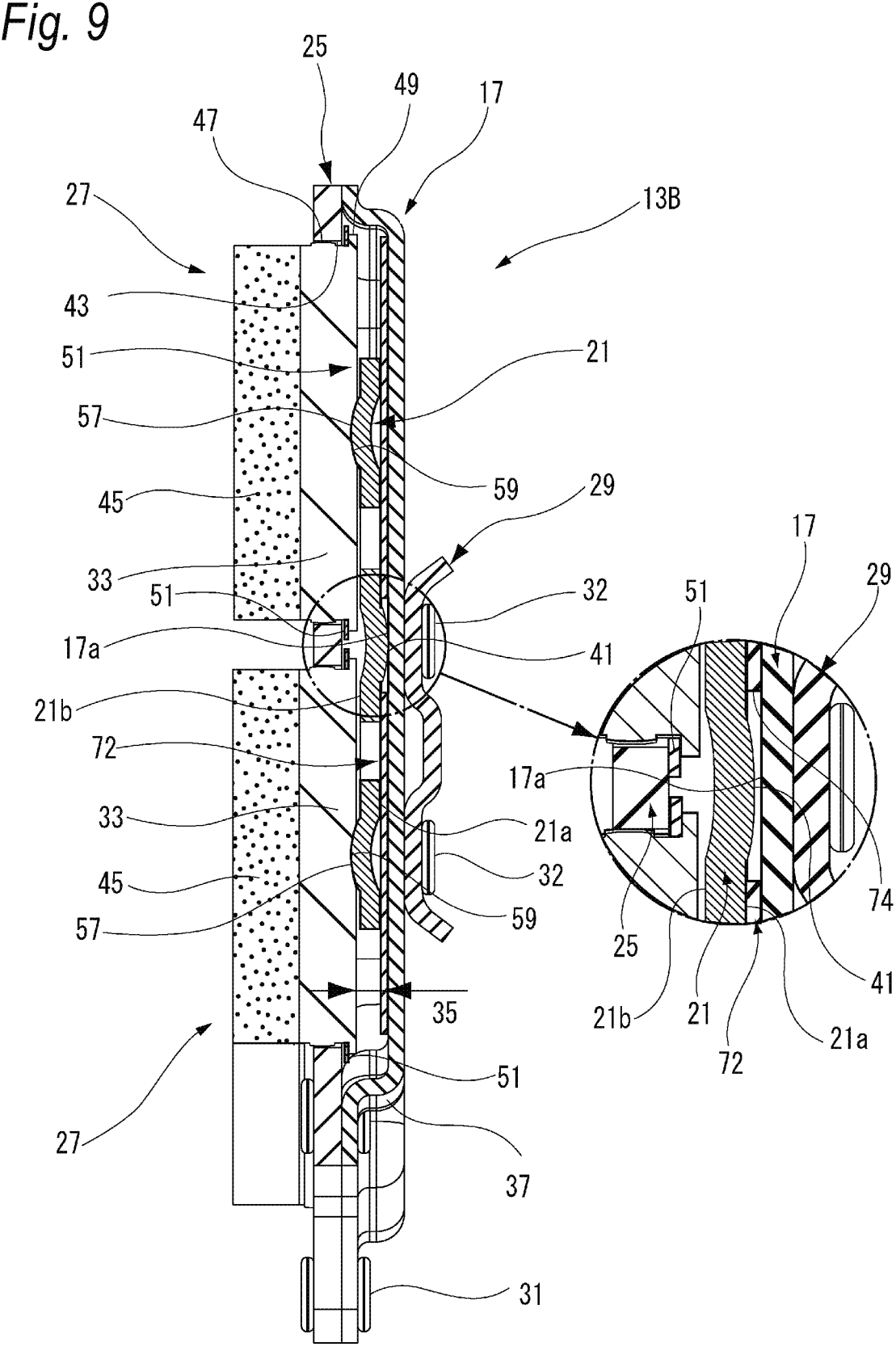
FIG. 9 is a sectional view showing a friction pad assembly for a disc brake according to a third embodiment of the present invention with an enlarged view of main portions.
Figure 10A:
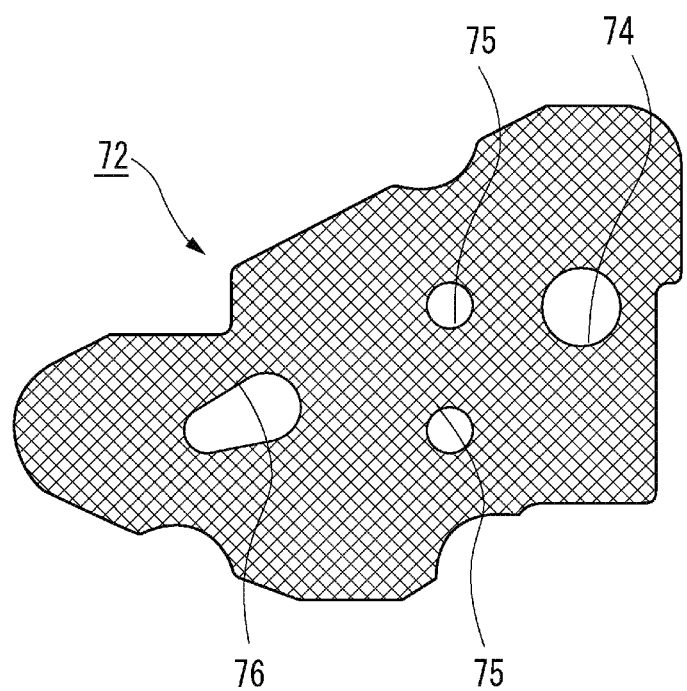
FIG. 10A is a front view of a damping layer shown in FIG. 9.

FIG. 9 is a sectional view showing the friction pad assembly for a disc brake according to the third embodiment of the present invention with an enlarged view of main portions. FIG. 10A is a front view of a damping layer shown in FIG. 9, and FIG. 10B is a front view of a torque receiving plate where the damping layer is attached.

Figure 10B:
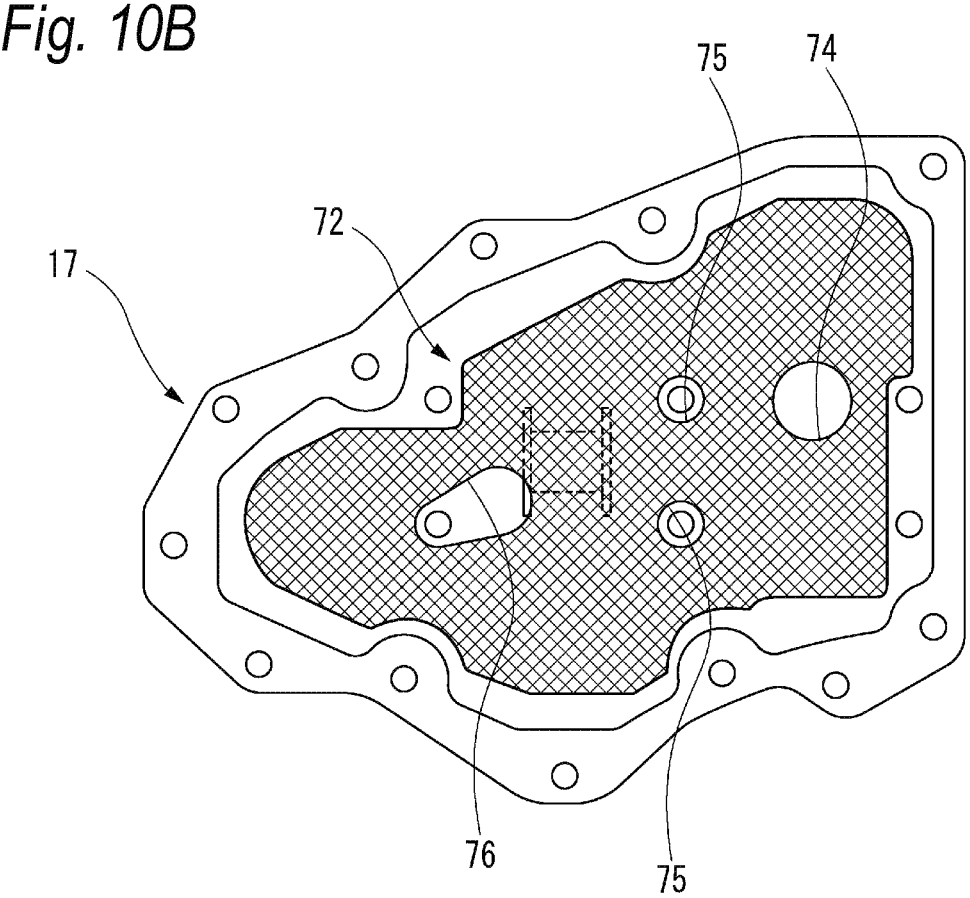
FIG. 10B is a front view of a torque receiving plate where the damping layer is attached.

As shown in FIG. 9 and FIGS. 10A and 10B, in the first friction pad assembly 13B of the friction pad assembly for a disc brake according to the third embodiment, embedment holes 74, 76 in which the plate abutting curved surface portion 41 which is a protrusion protruding to a position of the substantial gravity center of the first link plate 21 and the second link plate 23 toward the inner surface 17a of the torque receiving plate 17 is embedded, and an evasion hole 75 for avoiding interference with the rivets 32 for fixing the anchor plate 29, are bored on the damping layer 72. In the embedment hole 76, the plate abutting curved surface portion 41 is embedded, and in order to avoid interference with the rivets 32, an oval shape in which a small round and a big round are connected via a pair of tangent lines is bored. As a result, the surface of the damping layer 72 becomes the same flat surface as the inner surface 17a of the torque receiving plate 17. The damping layer 72 is attached to the inner surface 17a of the torque receiving plate 17 by, for example, an adhesive layer (not shown).

According to the friction pad assembly for a disc brake according to the third embodiment, since the plate abutting curved surface portion 41 of the first link plate 21 and the second link plate 23 are disposed in the embedment holes 74, 76 of the damping layer 72, the plate abutting curved surface portion 41 is disposed away from the torque receiving plate 17 (refer to an enlarged view of a main portion in FIG. 9). That is, even in a case where the conventional link plate on which the plate abutting curved surface portion 41 is protruded is used, it is possible to evade contact between the plate abutting curved surface portion 41 and the inner surface 17a of the torque receiving plate 17. As a result, since the damping layer 72 blocks or reduces vibration spreading between the lining assembly 27 and the torque receiving plate 17, it is possible to reduce noises.

Further, in the friction pad assembly for a disc brake in the above-described embodiments, the damping layer 53, the additional damping layer 62, and the damping layer 72 have an adhesive layer adhered to the inner surface 17a of the torque receiving plate 17 or the back plate portion 33. The adhesive layer of the present invention may have an adhesive force capable of at least temporarily tracking the damping layer on the torque receiving plate or the back plate portion.

Accordingly, the damping layer 53 and the damping layer 72 sandwiched between the inner surfaces 17a of the torque receiving plate 17 and the back surfaces 21a, 23a of the first link plate 21 and the second link plate 23 are adhered to the inner surfaces 17a of the torque receiving plate 17 by the adhesive layer. The additional damping layer 62 interposed between the back plate portion 33 and the surfaces 21b, 23b of the first link plate 21 and the second link plate 23 is adhered to the back plate portion 33 by an adhesive layer. Therefore, the guide plate 25, the lining assembly 27, the damping layer 53 (the additional damping layer 62 or the damping layer 72), the first link plate 21, the second link plate 23 and the torque receiving plate 17 are in a sequentially laminated and assembled procedure, the damping layer 53 (the additional damping layer 62 or the damping layer 72) is temporarily maintained in the back plate portion 33 or the torque receiving plate 17 in a positioned state. As a result, the friction pad assembly for a disc brake can be laminated and assembled without being restricted in the vertical direction, and can be assembled in high accuracy with easy assembling operation.

Next, modifications of the damping layer will be described.

Figure 11A:
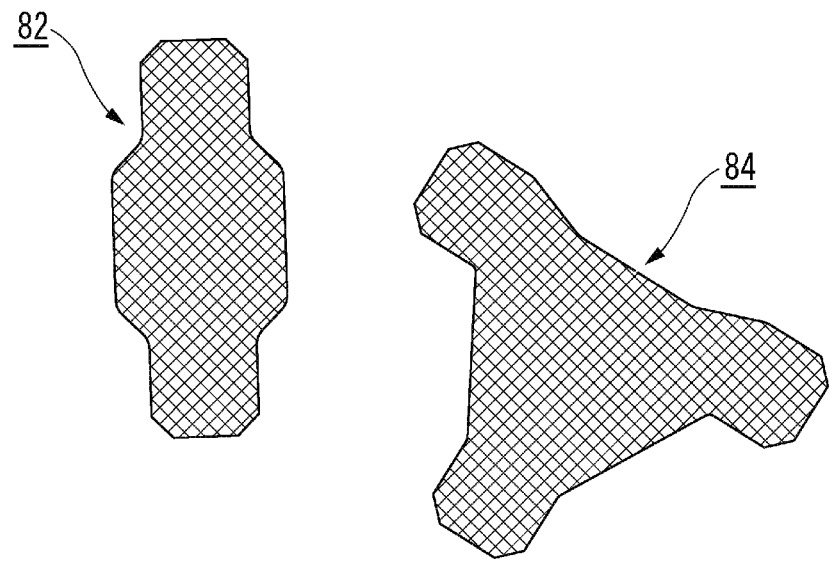
FIG. 11A is a front view of a damping layer according to a modification.
Figure 11B:
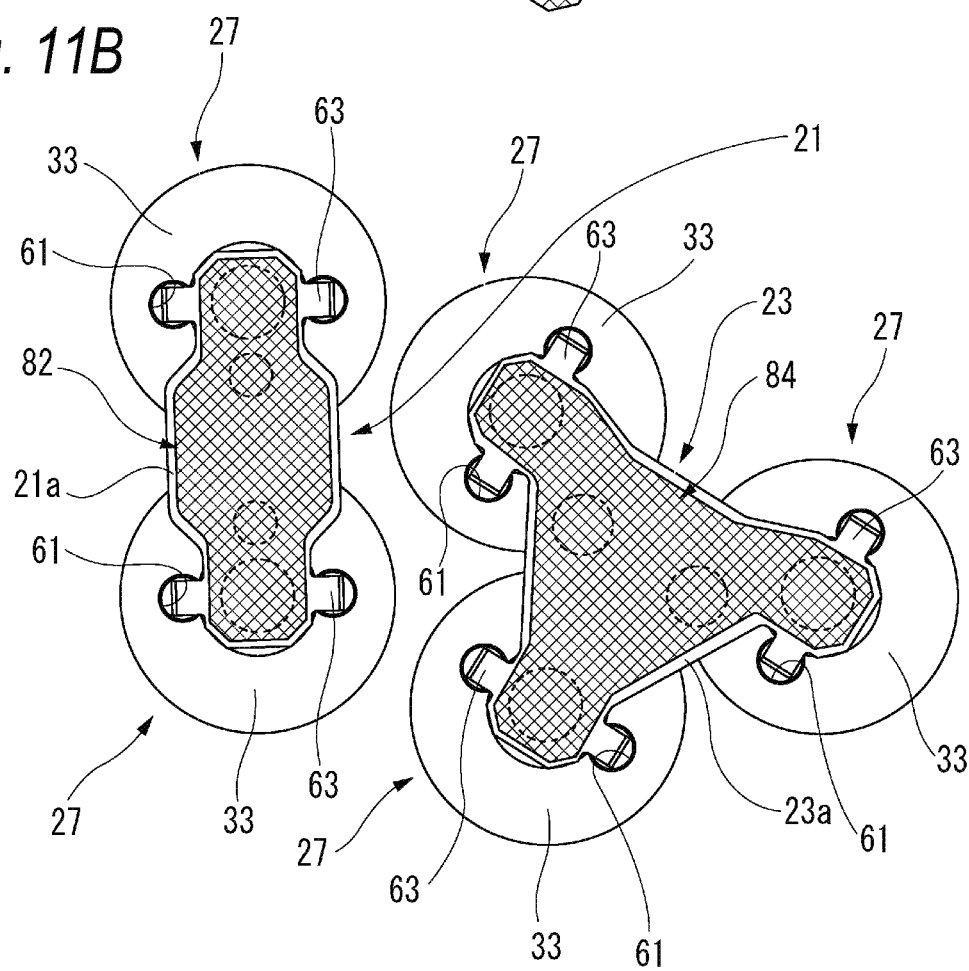
FIG. 11B is a back view of a link plate where the damping layer according to the modification is attached.

FIG. 11A is a front view of a damping layer according to a modification, and FIG. 11B is a back view of a link plate where the damping layer according to the modification is attached.

As shown in FIG. 11, in the friction pad assembly for a disc brake according to the modification, the damping layer 82 and the damping layer 84 are formed similar to the contour shapes of the first link plate 21 and the second link plate 23. The damping layer 82 and the damping layer 84 are attached to the back surfaces 21a, 23a of the first link plate 21 and the second link plate 23 by, for example, an adhesive layer (not shown).

According to the friction pad assembly for a disc brake according to this modification, the area of the damping layer 82 and the damping layer 84 is made smaller than the above-described damping layer 53, and the material cost may be reduced.

Next, a third embodiment of the friction pad assembly for a disc brake according to the present invention will be described.

Figure 12:
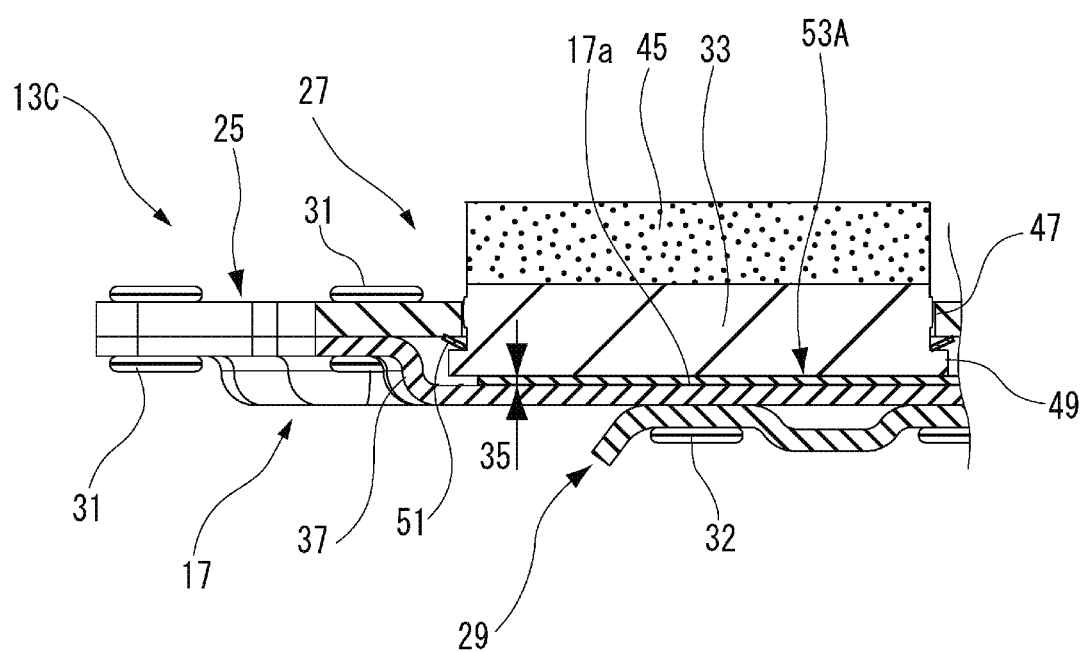
FIG. 12 is a sectional view of a friction pad assembly for a disc brake according to a fourth embodiment of the present invention.

FIG. 12 is a sectional view of a friction pad assembly for a disc brake according to a fourth embodiment of the present invention.

As shown in FIG. 12, in the first friction pad assembly 13C according to the fourth embodiment, the damping layer 53A is directly sandwiched between the back plate portion 33 and the inner surface 17a of the torque receiving plate 17. An evasion hole 55 (refer to FIG. 4A) for avoiding interference with the rivets 32 fixing the anchor plate 29 is bored on the damping layer 53A. The damping layer 53A is attached to the inner surface 17a of the torque receiving plate 17 by, for example, an adhesive layer (not shown).

According to the friction pad assembly for a disc brake according to the fourth embodiment, similar to the friction pad assembly 11 for a disc brake of the first embodiment, a firm housing structure without looseness due to vibration or the like is obtained, while a structure with high safety and low price where the lining assembly 27 does not fall off the guide plate 25 may be obtained.

In addition, the damping layer 53A provided between the inner surface 17a of the torque receiving plate 17 and the back plate portion 33 contributes to reduction of noises due to contact between the torque receiving plate 17 and the back plate portion 33. That is, since the damping layer 53A blocks or reduces the vibration spreading between the lining assembly 27 and the torque receiving plate 17, it is possible to reduce noises.

Next, a modification of the friction pad assembly for a disc brake shown in FIG. 12 will be described.

Figure 13:
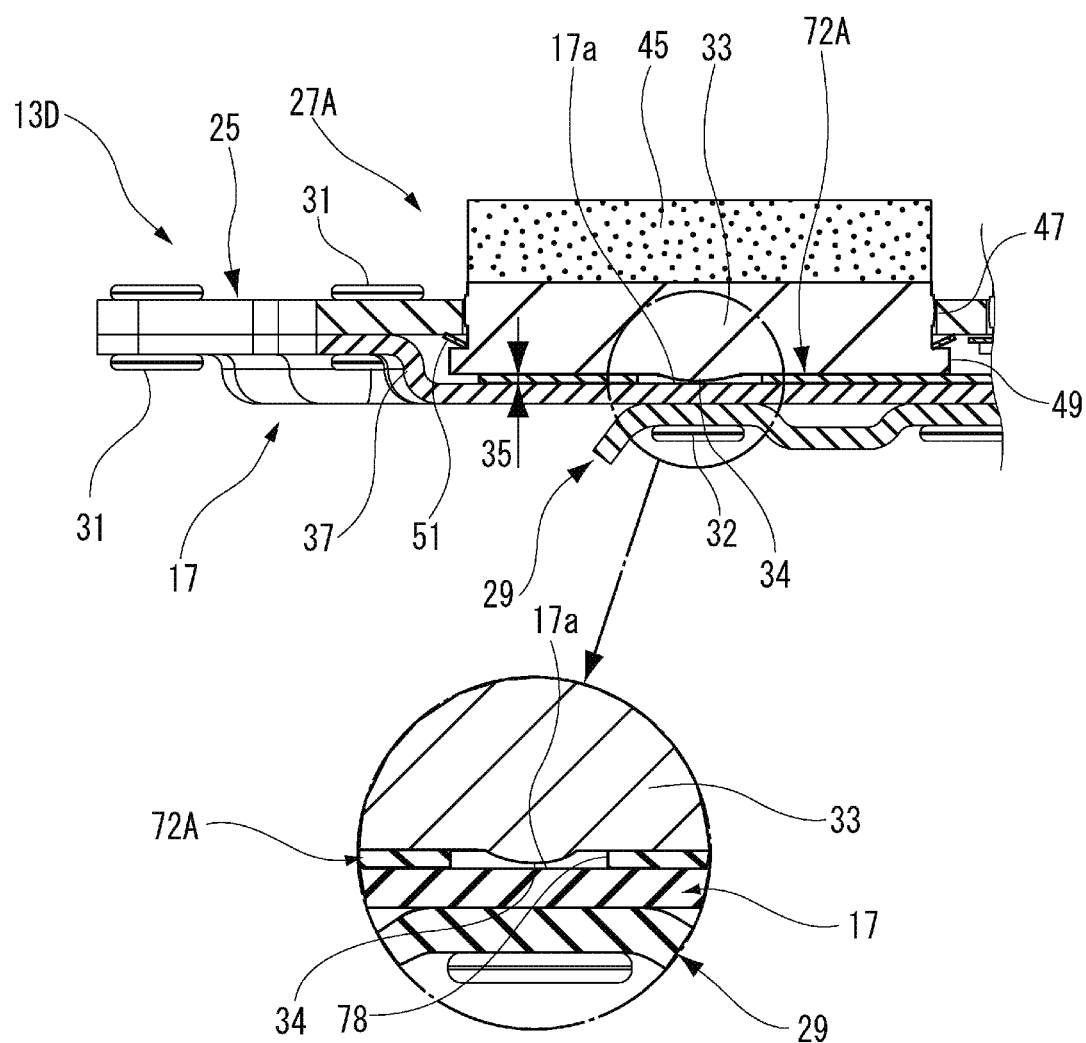
FIG. 13 is a sectional view showing a modification of a friction pad assembly for a disc brake shown in FIG. 12 with an enlarged view of main portions.

FIG. 13 is a sectional view showing the modification of a friction pad assembly for a disc brake shown in FIG. 12 with an enlarged view of main portions.

As shown in FIG. 13, in the friction pad assembly for a disc brake according to the modification, an embedment hole 78 where the plate abutting curved surface portion 34, which is a protrusion protruding to a substantially central position of the back plate portion 33, is embedded is bored in the damping layer 72A. As a result, the surface of the damping layer 72A becomes the same flat surface as the back surface of the back plate portion 33. The damping layer 72A is attached to the inner surface 17a of the torque receiving plate 17 by, for example, an adhesive layer (not shown).

According to the friction pad assembly for a disc brake according to the modification, since the plate abutting curved surface portion 34 of the back plate portion 33 is disposed in the embedment hole 78 of the damping layer 72A, the plate abutting curved surface portion 34 is disposed away from the torque receiving plate 17 (refer to an enlarged view of a main portion in FIG. 13). That is, even in a case where the lining assembly 27A on which the plate abutting curved surface portion 34 is protruded to the back plate portion 33 is used, it is possible to evade contact between the plate abutting curved surface portion 34 and the inner surface 17a of the torque receiving plate 17. As a result, since the damping layer 72A blocks or reduces vibration spreading between the lining assembly 27 and the torque receiving plate 17, it is possible to reduce noises.

That is, the damping layer of the present invention is provided between the torque receiving plate and the back plate portion, and as long as the contact between the torque receiving plate and the back plate portion may be evaded, various forms of different number, shape, size or the like may be obtained.

Here, the characteristics of embodiments of the friction pad assembly for a disc brake according to the present invention described above are briefly summarized and listed below.

[1] A friction pad assembly (11) for a disc brake, wherein a plurality of lining assemblies (27) are supported swingably on a guide plate (25) receiving a braking torque, and the lining assemblies are pressed against a disc rotor, wherein the lining assembly has a friction material (45) contacting with the disc rotor at the time of braking and a back plate portion (33) adhered to a back surface of the friction material, and includes a plate fitting portion (47) fitting swingably into a guide hole portion (43) provided on the guide plate at the back plate portion, the plate fitting portion is inserted and equipped to the guide hole portion from a back surface side of the guide plate, a braking torque acting when the disc rotor is brought into contact with the friction material is transmitted from the plate fitting portion to the guide plate, and a damping layer (53, 62, 72, 82, 84) is provided between the torque receiving plate (17) and the back plate portion adhered to the guide plate.

[2] The friction pad assembly (11) for a disc brake described in [1] above, wherein a plurality of link plates (a first link plate 21, a second link plate 23) are provided which are deployed across a plurality of the lining assemblies (27) between the torque receiving plate (17) and the back plate portion (33) and allow pressing force from the torque receiving plate to act on the lining assemblies, and the damping layers (82,84) are provided on at least one side of the front surface side and the back surface side of the link plate.

[3] The friction pad assembly for a disc brake described in [2] above, wherein the damping layer is sandwiched between the inner surface of the torque receiving plate and the back surface of the link plate.

[4] The friction pad assembly (11) for a disc brake described in any one of [1] to [3] above, wherein the damping layer (53) is a laminated shim where a metal support plate (a stainless steel plate 54, a cold rolled steel plate 56) and an elastic material (rubber 50, 58, an adhesive material 52) are stuck together and laminated.

[5] The friction pad assembly (11) for a disc brake described in [3] above, wherein an embedment hole (74, 76), into which a protrusion (the plate abutting curved surface portion 41) protruding from the link plate toward the inner surface of the torque receiving plate is embedded, is formed in the damping layer (72) sandwiched between the inner surface of the torque receiving plate and the back surface of the link plate.

[6] The friction pad assembly (11) for a disc brake described in any one of [1] to [5] above, wherein the damping layer (53) has an adhesive layer adhered to the inner surface (17a) of the torque receiving plate (17) or the back plate portion (33).

The friction pad assembly for a disc brake of the present invention is not limited to the above-described embodiments, and appropriate modifications, improvement or the like are possible based on the object of the invention.

For example, in a case where one friction pad assembly for a disc brake is configured by a plurality of unit friction pad assemblies, the number of unit friction pad assemblies may be one or three or more.

Also, the link plate is not limited to the above-described embodiments, is sandwiched and fixed between the guide plate and the torque receiving plate to maintain the distance therebetween while disposed across a plurality of lining assemblies, and it is needless to say that various forms can be adopted as long as the pressing force from the torque receiving plate can be applied to the lining assemblies.

In addition, the application is based on a Japanese Patent Application (Patent Application No. 2015-181143) applied on Sep. 14, 2015, the contents of which are herein incorporated by reference.

INDUSTRIAL APPLICABILITY

According to the present invention, a friction pad assembly for a disc brake which can suppress the processing cost, reduce the possibility of losing configuration components, and reduce noises can be provided. The present invention which exerts this effect is useful for a disc brake device for a railroad vehicle.

DESCRIPTION OF REFERENCE NUMERALS 11 friction pad assembly for disc brake
17 torque receiving plate
17a inner surface
21 first link plate (link plate)
21a back surface 21b back surface
23 second link plate (link plate)
23a back surface
23b back surface
25 guide plate
27 lining assembly
33 back plate portion
35 gap
41 plate abutting curved surface portion (protrusion)
43 guide hole portion
45 friction material
47 plate fitting portion
50 rubber (elastic material)
52 adhesive material (elastic material)
53, 72 damping layer
54 stainless steel plate (metal support plate)
56 cold rolled steel plate (metal support plate)
58 rubber (elastic material)
62 additional damping layer (damping layer)
74, 76 embedment hole

The invention claimed is:

1. A friction pad assembly for a disc brake, the friction pad assembly comprising:
a guide plate configured to receive braking torque, and provided with a guide hole portion; and
a plurality of lining assemblies supported swingably on the guide plate and configured to be pressed to a disc rotor, each of the lining assemblies includes i) a friction material configured to contact with the disc rotor when braking, and ii) a back plate portion adhered to a back surface of the friction material;
the friction pad assembly further comprising:
a torque receiving plate fixed to the guide plate;
a damping layer sandwiched by the torque receiving plate and the back plate portion of each of the lining assemblies; and
a link plate deployed across the plurality of lining assemblies and provided between the torque receiving plate and the back plate portion of each of the lining assemblies so as to apply a pressing force from the torque receiving plate to the plurality of lining assemblies,
wherein the back plate portion of each of the lining assemblies includes a plate fitting portion fitting swingably into the guide hole portion,
wherein the plate fitting portion is inserted and equipped to the guide hole portion from an inner surface side of the guide plate such that the braking torque acting when the disc rotor and the friction material contact is transmitted from the plate fitting portion to the guide plate,
wherein the damping layer is provided on a side of a back surface of the link plate,
wherein the link plate is formed with a protrusion that protrudes toward an inner surface of the torque receiving plate on the back surface of the link plate,
wherein the protrusion enters into an embedment hole formed in the damping layer so as to be separated from an inner peripheral surface of the embedment hole,
wherein the protrusion has a plate abutting curved surface disposed in the embedment hole and separated away from the torque receiving plate, and
wherein the damping layer has an adhesive layer adhered to the inner surface of the torque receiving plate or the back plate portion.

2. The friction pad assembly according to claim 1, wherein the damping layer is a laminated shim in a state where a metal support plate and an elastic material are stuck together and laminated.

3. The friction pad assembly according to claim 1, wherein the guide plate and the torque receiving plate are formed into an integrated housing structure by fastening members.

4. The friction pad assembly according to claim 3, wherein the fastening members are rivets.

5. A friction pad assembly for a disc brake, the friction pad assembly comprising:
a guide plate configured to receive braking torque, and provided with a guide hole portion; and
a plurality of lining assemblies supported swingably on the guide plate and configured to be pressed to a disc rotor, each of the lining assemblies includes i) a friction material configured to contact with the disc rotor when braking, and ii) a back plate portion adhered to a back surface of the friction material;
the friction pad assembly further comprising:
a torque receiving plate fixed to the guide plate; and
a damping layer sandwiched by the torque receiving plate and the back plate portion of each of the lining assemblies,
wherein the back plate portion of each of the lining assemblies includes a plate fitting portion fitting swingably into the guide hole portion,
wherein the plate fitting portion is inserted and equipped to the guide hole portion from an inner surface side of the guide plate such that the braking torque acting when the disc rotor and the friction material contact is transmitted from the plate fitting portion to the guide plate,
wherein the back plate portion of each of the lining assemblies includes a plate fitting portion fitting swingably into the guide hole portion,
wherein the damping layer is provided on a side of a back surface of a link plate,
wherein the link plate is formed with a protrusion that protrudes toward an inner surface of the torque receiving plate on the back surface of the link plate,
wherein the protrusion enters into an embedment hole formed in the damping layer so as to be separated from an inner peripheral surface of the embedment hole,
wherein the protrusion is separated away from the torque receiving plate, and
wherein the damping layer has an adhesive layer adhered to an inner surface of the torque receiving plate or the back plate portion.

6. The friction pad assembly according to claim 5, wherein the damping layer is a laminated shim in a state where a metal support plate and an elastic material are stuck together and laminated.

7. The friction pad assembly according to claim 5, wherein the guide plate and the torque receiving plate are formed into an integrated housing structure by fastening members.

8. The friction pad assembly according to claim 7, wherein the fastening members are rivets.

* * * * *